Nov. 29, 1960  T. R. FINLAYSON  2,962,034
SHELTER AND METHOD OF MAKING SAME
Filed June 25, 1958  7 Sheets-Sheet 1
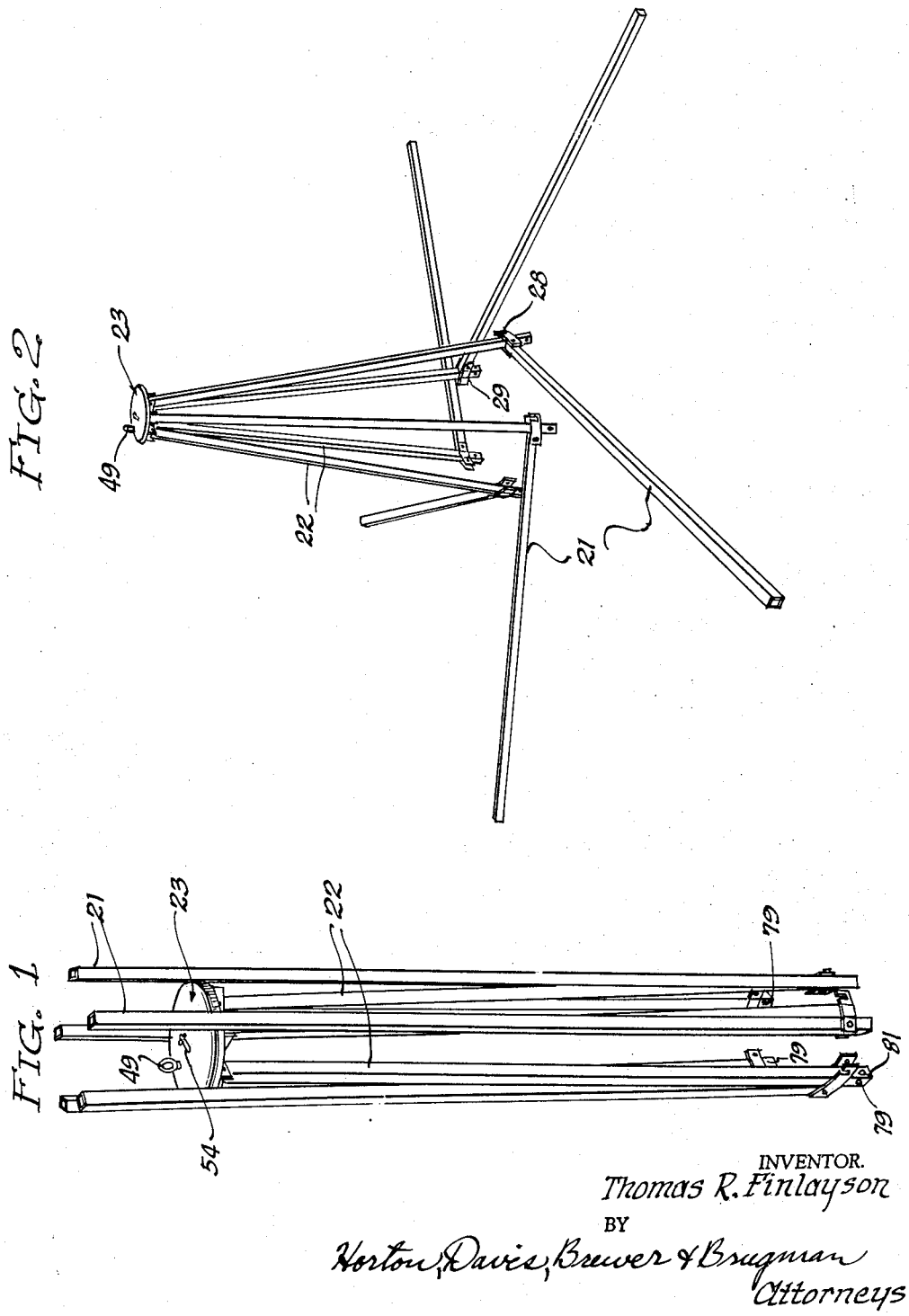
INVENTOR.
Thomas R. Finlayson
BY
Horton, Davis, Brewer & Brugman
Attorneys Nov. 29, 1960 T. R. FINLAYSON 2,962,034
SHELTER AND METHOD OF MAKING SAME
Filed June 25, 1958 7 Sheets-Sheet 2
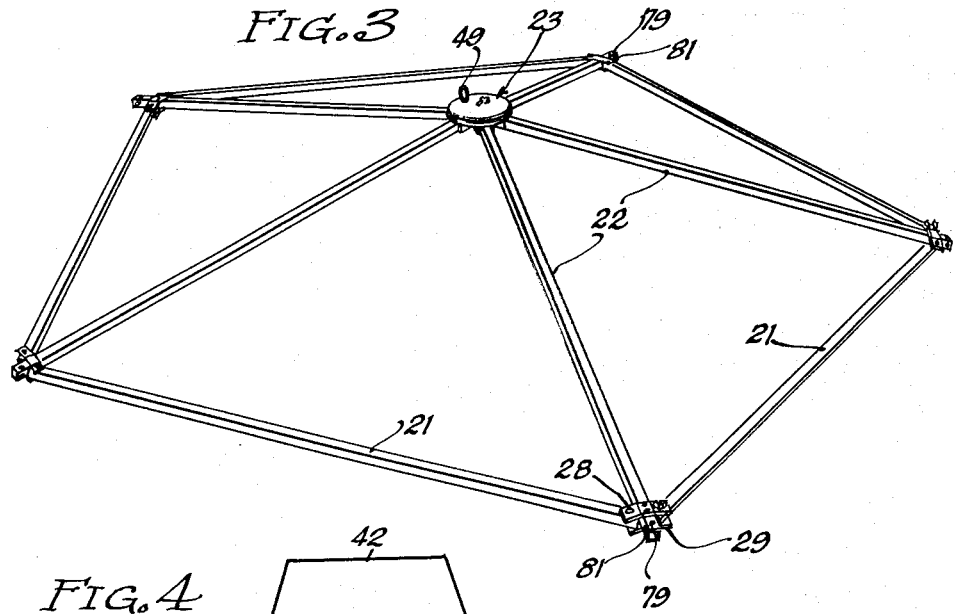
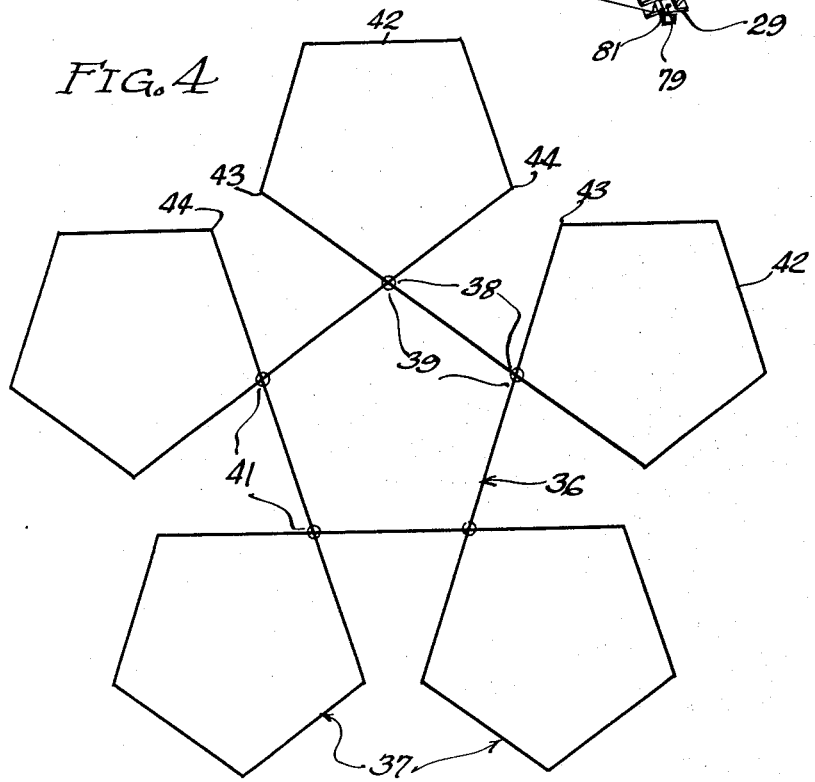
INVENTOR.
Thomas R. Finlayson
BY
Horton, Davis, Brewer & Brugman
Attorneys Nov. 29, 1960 T. R. FINLAYSON 2,962,034
SHELTER AND METHOD OF MAKING SAME
Filed June 25, 1958 7 Sheets-Sheet 3
FIG. 5
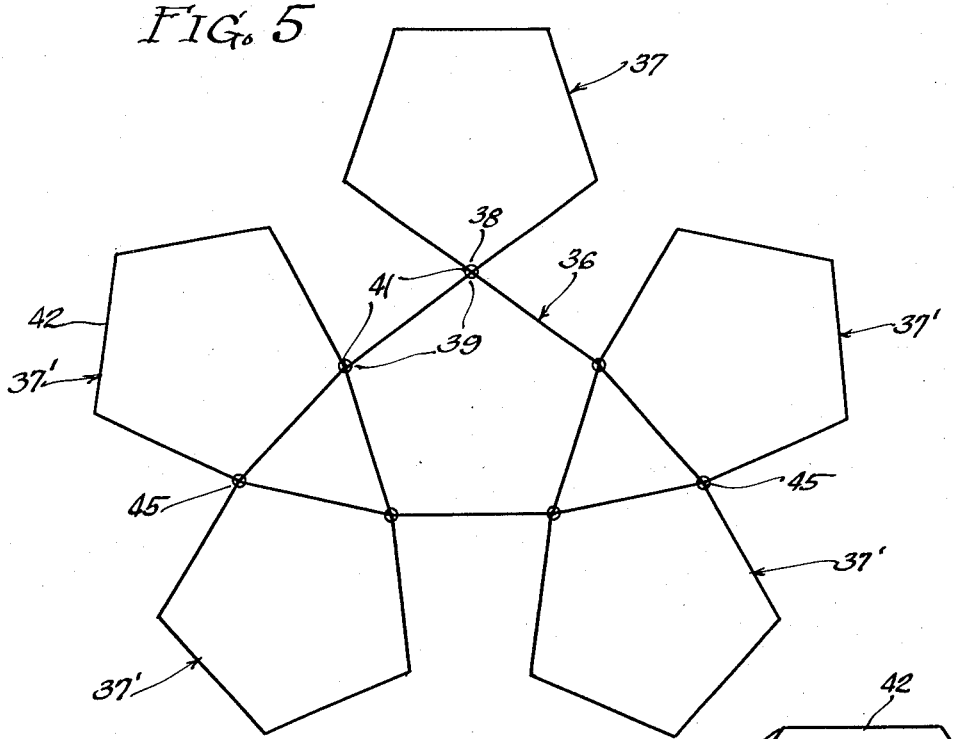
FIG. 6
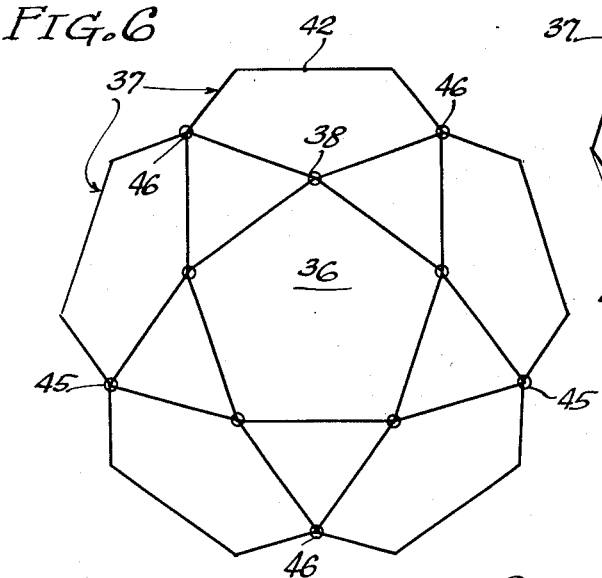
FIG. 7
INVENTOR.
Thomas R. Finlayson
BY
Horton, Davis, Brewer & Brugman
Attorneys Nov. 29, 1960 T. R. FINLAYSON 2,962,034
SHELTER AND METHOD OF MAKING SAME
Filed June 25, 1958 7 Sheets-Sheet 4

INVENTOR.
Thomas R. Finlayson
BY
Horton, Davis, Brewer & Brugman
Attorneys

Nov. 29, 1960    T. R. FINLAYSON    2,962,034
SHELTER AND METHOD OF MAKING SAME
Filed June 25, 1958    7 Sheets-Sheet 5
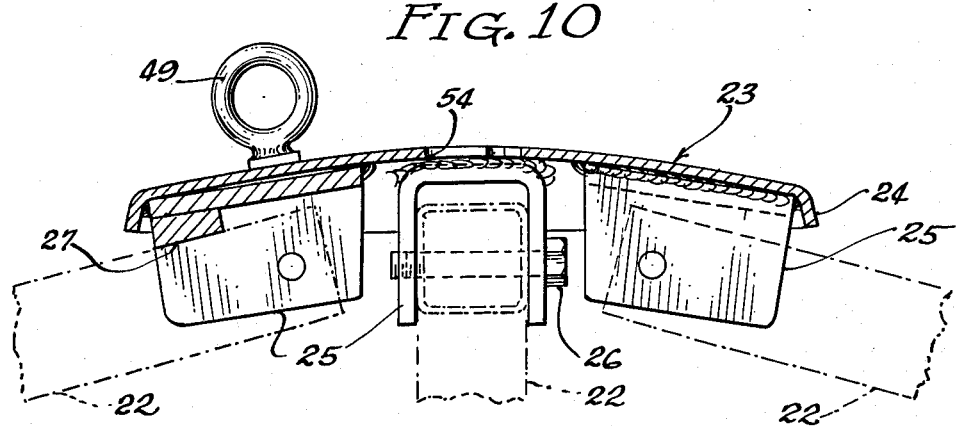
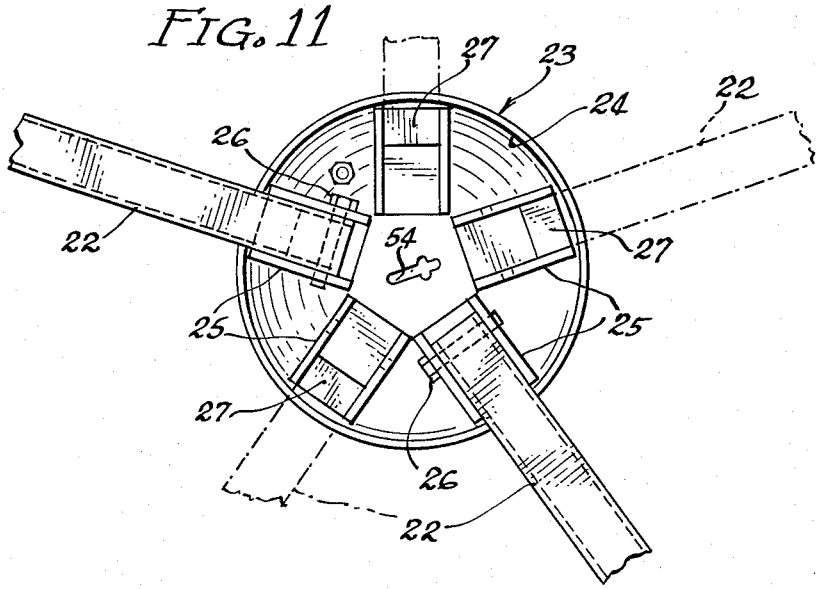
INVENTOR.
Thomas R. Finlayson
BY
Horton, Davis, Bruner & Brugman
Attorneys

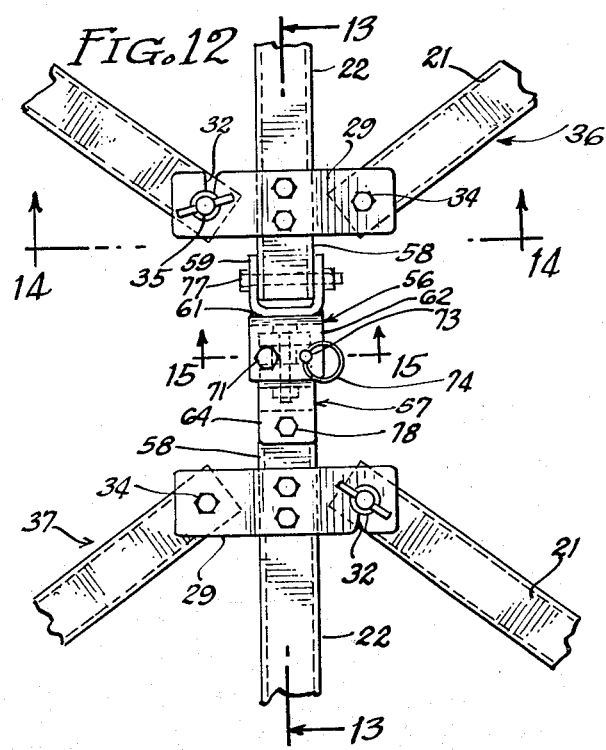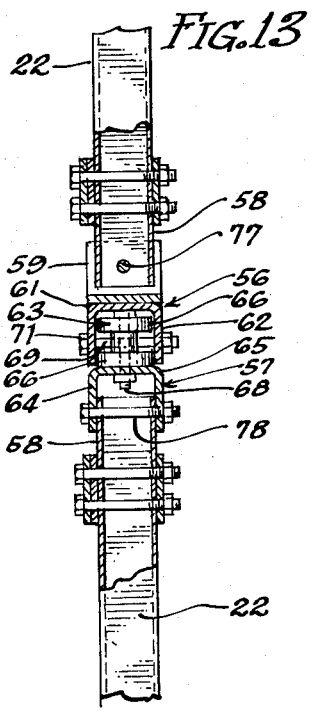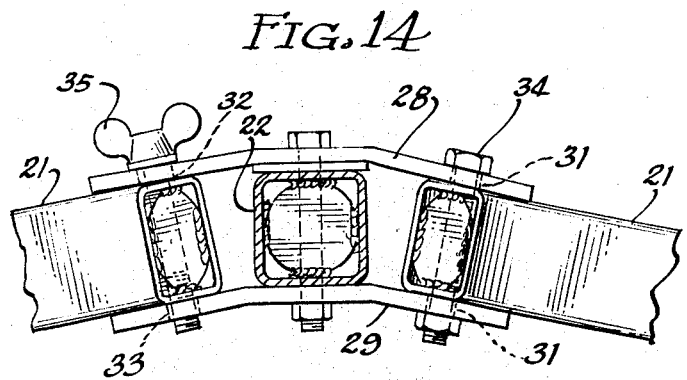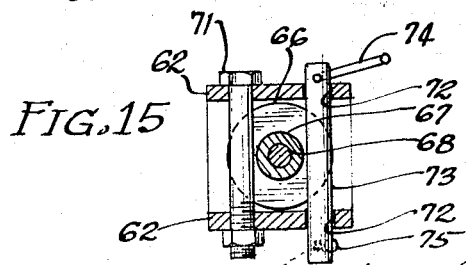

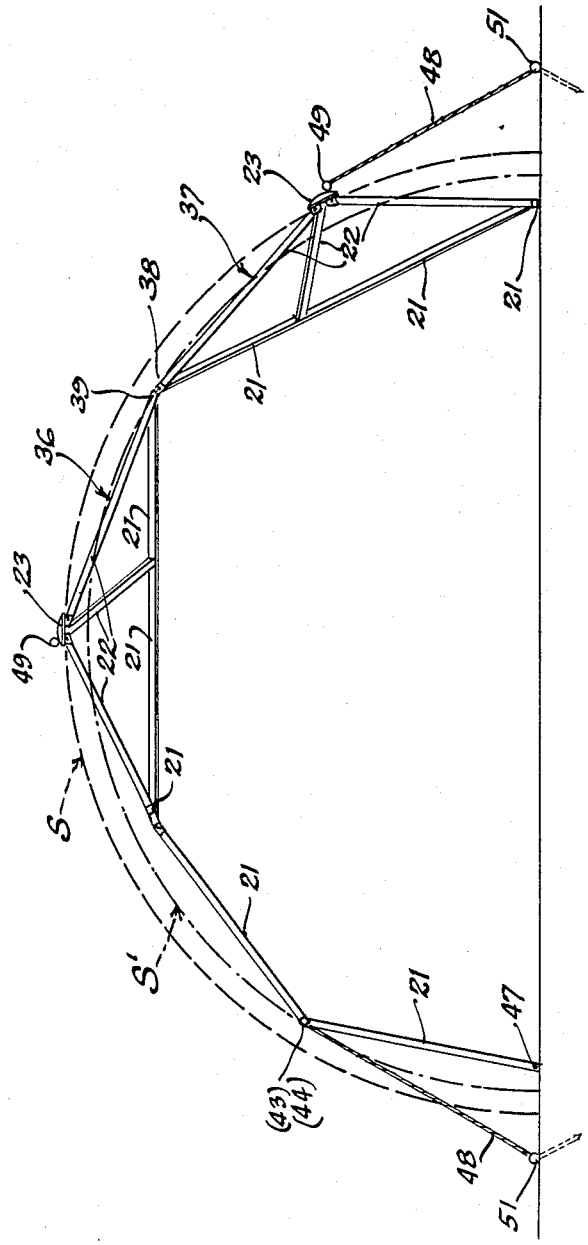

United States Patent Office 2,962,034
Patented Nov. 29, 1960

2,962,034

SHELTER AND METHOD OF MAKING SAME

Thomas R. Finlayson, Milwaukee, Wis., assignor to Gleason Reel Corp., Milwaukee, Wis., a corporation of Wisconsin Filed June 25, 1958, Ser. No. 744,517

14 Claims. (Cl. 135—4)

This invention relates in general to building construction and has more particular reference to a shelter and method of making the same.

United States Letters Patent No. 2,682,235 of Richard Buchminster Fuller, relates to a shelter of a covered and/or lined skeletal framework and another shelter of equilateral rhombus—or diamond-shaped sheets—each sheet having a minor diagonal equal to the length of a side thereof. According to that patent, the main structural shelter elements, i.e., the struts of the skeletal framework and the sheets in the other shelter, are so interconnected that the longitudinal center lines of the struts or, as the case may be, the major diagonals of the sheets, lie substantially in great circle planes of a common sphere and form either arcs or chords of great circles of that sphere. Such shelters are of substantially spherical or dome shape and are called geodesic dome shelters because they involve such lines and diagonals and a pattern created by the intersections of great circle lines or arcs, or their chords, designated geodesic lines and a geodesic pattern, respectively, in that patent.

While such geodesic dome shelters are characterized by a remarkable weight-strength ratio and the ability to withstand high stresses, their use has been limited due to the difficulties or objectionable features encountered in making them. Those difficulties or objectionable features include the multiplicity of struts and sheets of the same and different sizes, and the individual handling and fitting together of such elements in making the shelter. Another difficulty or objectionable feature of such shelters is the necessity of special tools to make such a shelter by either of the two methods hitherto employed.

According to one of those methods, after assembling on the ground the struts, or sheets to form the very top or apex portion of the shelter, the other elements are individually connected thereto radially outwardly therefrom in all directions, and the connected elements are gradually lifted as the work proceeds until in the end the shelter rests with its lowermost elements against the ground or on a foundation prepared to receive it. In the other of those methods, after assembling on the ground or other foundation, the struts, or sheets to form the base periphery of the shelter, the other elements are individually connected thereto to form the shelter. In the former method, the required special tools include some means for gradually lifting the structure during the construction of the shelter; in the latter method, they include ladders and/or scaffolding. In both methods, the time, skill, and special tools needed for making the shelter have militated against its use for temporary shelters and many other purposes where its advantages would otherwise make it very desirable.

An object of the present invention is the provision and production of an improved shelter, generally similar to that of the above-identified patent, which, while having the advantages of the latter, overcomes the foregoing objectionable features and disadvantages thereof.

Another object of the invention is the provision and production of such a shelter which is adapted not only for quick assembly from, but also for rapid dismantling into, a relatively few discrete structural units that are of such size, weight, and construction as to facilitate the handling and transportation thereof.

A further object of the invention is the provision and production of such a shelter constructed of a plurality of discrete equilateral polygonal units which are respectively foldable into compact, readily portable bundles that are adapted to be unfolded and rigidified for use in making the shelter.

Other objects and advantages of the invention will appear from the following description thereof which, in connection with the accompanying drawing, discloses, by way of example, a preferred embodiment of the invention.

In the accompanying drawing:

Figure 1 is a perspective view of a novel structural unit folded into a portable bundle that is adapted to be unfolded and rigidified for use in making a shelter embodying some of the features of the invention;

Fig. 2 is a view similar to Fig. 1 showing the novel unit during the folding or unfolding thereof;

Fig. 3 is a perspective view of the structural unit of Fig. 1, showing the unfolded rigidified unit prior to its incorporation in a novel shelter;

Fig. 4 is a more or less diagrammatic plan view of a plurality of pivotally interconnected structural units illustrative of a step in the novel method of making the improved shelter of the invention;

Fig. 5 is a view like Fig. 4 illustrative of another step in the novel method of the invention;

Fig. 6 is a view like Figs. 4 and 5 illustrative of another step in the novel method and shows a plan view of the substantially dome-shaped structure;

Fig. 7 is a fragmentary view like Fig. 6 illustrative of a step in the novel method and shows the structure ready for anchoring and/or covering or lining;

Fig. 10 is a diametrical cross-sectional view taken through the hub or apex member shown in Fig. 3;

Fig. 11 is a bottom plan view of the apex member shown in Fig. 10;

Fig. 12 is a fragmentary plan view of a roof shelter unit and a wall shelter unit connected thereto and shows a novel releasable connection employed for pivotally connecting the structural units together according to the invention;

Fig. 13 is a cross-section taken substantially along the lines 13—13 of Fig. 12;

Fig. 14 is a cross-section taken substantially along the lines 14—14 of Fig. 12;

Fig. 15 is a cross-section taken substantially along the lines 15—15 of Fig. 12; and Fig. 16 is a view like Fig. 9 with certain parts omitted and shows the discrete shelter or structural units with radial and peripheral struts of different relative lengths from those shown in Fig. 9.

Figure 8:
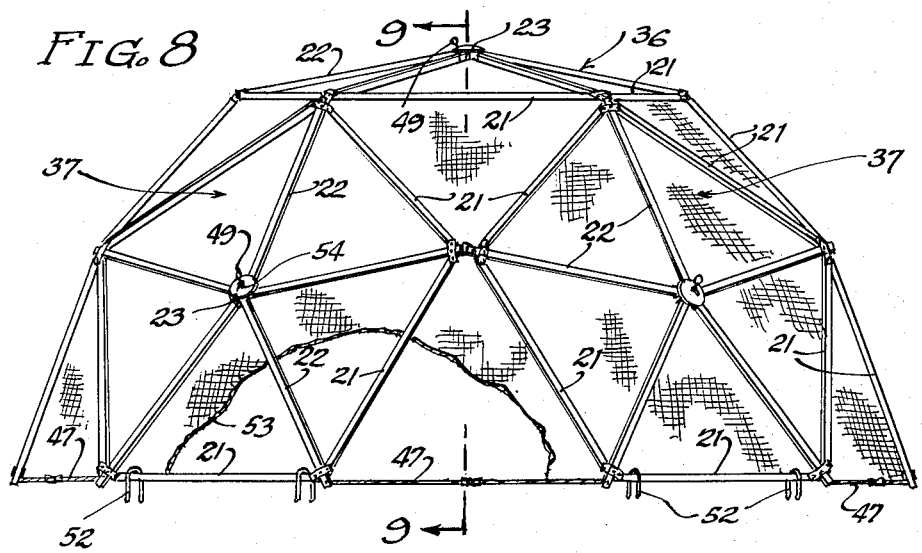
Fig. 8 is a side elevational view of a novel shelter embodying some of the features of the invention.

According to the present invention, the novel dome shelter is constructed of a plurality of discrete shelter units which are prefabricated of such size, shape, and construction that a relatively few of them are readily interconnectible to form a shelter framework or shell of generally semispherical form. While each such unit may be made in the form of a flat equilateral pentagon or other regular polygon, it is preferably prefabricated as a pyramidal or polyhedral structure having a base in the shape of a regular polygon and an apex or peak portion in coaxial spaced relationship to the base. It will be understood from the ensuing description that such a prefabricated shelter unit may be stamped or otherwise made of sheet metal or other suitable material to provide either the flat or pyramidal structure.

Each shelter unit is, however, preferably prefabricated of aluminum or other light metal struts of tubular stock which are interconnected to form a truss, and comprises, as shown in Figs. 1 to 3, peripheral struts 21 defining a flat equilateral pentagon base or other regular polygon and radial struts 22 extending between the center and each base vertex or corner of the polygon. Where the truss is of pyramidal or polyhedral structure, as shown in Fig. 3, the peripheral struts 21 define the regular polygon base and the radial struts 22 converge from each vertex or corner of the base to meet at the central apex portion or peak of the pyramid. An aluminum tubular strut size found satisfactory for a shelter of about 30 feet in base diameter is about 1⅝ inches square with a wall thickness of about 1/16 of an inch and a length of from about 8 feet to about 8½ feet.

To facilitate the handling and transportation of the novel shelter and the discrete components thereof, which is of particular importance where a temporary shelter is desirable, the prefabricated shelter units or trusses of the above described struts are each so constructed as to be foldable into compact, readily portable bundles (Fig. 1) which can be handled by an individual. To that end each such shelter unit comprises a hub or apex member 23 cast or otherwise formed, as shown in Figs. 10 and 11, with an annular body having a depending peripheral flange 24, and a number of channel members or means 25 equal to the number of radial struts to be employed in the shelter unit. Where channel members are employed as such means 25, they are welded to or otherwise made integral with the apex member 23 in equi-spaced relationship about the center thereof and extend radially outwardly toward the flange 24, the spaced parallel flanges of each channel member depending below the flange 24. The channel members 25 are open at their outer ends and along their lower sides to receive the inner end portions of the radial struts, respectively.

An end portion of each radial strut 22 is pivotally secured between the spaced parallel flanges of each channel member 25 by bolt-and-nut or other suitable pin means 26 extending transversely through the radial strut and anchored in the spaced parallel flanges of the channel member. When so pivotally connected to the apex member, the radial struts are swingable between a first position (Fig. 1) at which they extend from the apex member in parallel relationship along the axis thereof and a second position (Fig. 3) at which they extend in radial directions outwardly from the apex member. To limit the swinging movement of each radial strut to its latter or radial position, suitable abutment means 27 (Figs. 10 and 11) is provided between the parallel flanges of each channel member 25 and radially outwardly beyond the pin means 26.

For connecting the outer or swingable end of each radial strut 22 to opposing end portions of adjacent peripheral struts at a base vertex or corner of the shelter unit, upper and lower metal plates 28 and 29 are bolted or otherwise secured to the radial strut near the outer end of the upper and lower or, as the case may be, the outer and inner sides of the radial strut, depending upon the position of that strut as already described. Those plates of each shelter unit are equidistant from the center thereof and extend transversely of and beyond the opposite sides of the respective radial struts for connecting the peripheral struts 21 in end-to-end relationship when the radial struts are in their radial positions. For that purpose, at, for example, the clockwise side (Fig. 3) of each radial strut, the plates 28 and 29 secured thereto have axially aligned apertures 31 (Fig. 14) At the other side of each radial strut, the plate 28 is provided with a slot 32 opening through its upper or, as the case may be, the inner edge thereof while the plate 29 is provided with an aperture 33 in aligned relationship with the closed end of the slot 32.

The axially aligned apertures 31 cooperate with bolt-and-nut or other suitable pin means 34 for pivotally securing a corresponding end portion of the respective peripheral struts 21 between the plates 28 and 29 of the respective radial struts. The opposite or swingable end portion of each peripheral strut carries a wing-head bolt 35 threaded therein and of a length to extend therethrough. The arrangement is such that the several peripheral struts 21 are each foldable or swingable to and from parallel relationship with the radial strut 22 with respect to which it is pivoted by the pin means 34 (see Figure 2).

During swinging of the peripheral struts 21 about the respective pin means 34 from parallel relationship with the radially positioned radial struts 22, the swingable end portion of each peripheral strut is receivable between the sides of the plates 28 and 29 on the next succeeding radial strut which include the slot 32 and aperture 33, respectively. Each peripheral strut in so swinging moves the portion of the shank of the bolt 35 between the wing-head thereof and the adjacent side of the peripheral strut carrying that bolt into the slot 32, through the open end of the latter. In that position, each wing-head bolt 35 is manually operable in a direction to advance it until the plate 28 is releasably clamped between the peripheral strut and the wing-head of the bolt, and the shank of the bolt extends from the wing-head through that peripheral strut and into the aperture 33 of the plate 29. Each wing-head bolt 35 is manually operable in the opposite direction to permit the swingable end portion of the corresponding peripheral strut 21 to be disconnected from the radial strut and swung to its folded position in parallel relationship to the next preceding radial strut to which its opposite end is pivotally secured by the pin means 34.

With such a construction, each prefabricated shelter unit or truss is foldable into the compact readily portable bundle (Fig. 1) wherein the peripheral strut 21 pivoted to the outer end of each radial strut 22 is in adjacent parallel relationship thereto and the peripheral and radial struts extend along the axis of the apex member 23 to which the inner ends of the radial struts are pivoted. Each such bundle is unfoldable by swinging the radial struts and the peripheral struts respectively pivoted thereto outwardly toward the radial positions with respect to the apex member 23, and thereafter swinging the respective peripheral struts about the pin means 34 into spanning relationship between outer end portions of the peripherally succeeding radial struts to move the shanks of the bolts 35 into the slots 32, respectively. The bolts 35 are thereupon tightened for releasably securing the swinging ends of the peripheral struts 21 to the outer ends of the radial struts 22, thus forming a rigid shelter unit or truss of polygonal shape.

By employing peripheral struts 21 and radial struts 22 of appropriate relative lengths, such a truss may be constructed in the form of a pyramid or polyhedron wherein the peripheral struts define an equilateral pentagon or other regular polygon base and the radial struts as equilateral sides of faces of the pyramid converge upwardly from the vertices or corners of the base to the central apex member 23, the radial struts holding the base and the apex member in parallel, coaxially spaced relationship, as shown in Fig. 3.

Illustrative of the novel method of the invention, one of the improved shelters comprises, as shown by way of example in Figs. 4, 5, and 6, a discrete roof or central shelter unit or truss, designated by the reference character 36, in the shape of an equilateral pentagon or other regular polygon, and a number of substantially identical, discrete wall or peripheral shelter units or trusses 37 each in the shape of an equilateral pentagon or other regular polygon and equl to the number of vertices of the roof shelter unit. It will be understood that those shelter units are constructed as hereinabove described, but are shown in those views of the drawing more or less diagrammatically to facilitate an understanding of the method.

A plurality of such shelter units are arranged flat on the ground or other substantially horizontal supporting surface in a cluster or circular pattern with the roof or central shelter unit 36 at the center and with a vertex or corner 38 of each wall or peripheral shelter unit 37 opposed to each vertex or corner 39 of the roof shelter unit. While in that position, the vertex or corner 38 of each wall shelter unit is connected, as shown in Fig. 4, to the opposed vertex or corner 39 of the roof shelter unit by pivotal joint means 41 adapted to enable the swinging of each wall shelter unit about a substantially vertical axis and about a substantially horizontal axis i.e., axes mutually perpendicular. When so connected, each wall shelter unit 37 is swingable in a direction toward and away from the wall shelter units at the opposite sides of the roof or central shelter unit and in a direction substantially normal to the first mentioned direction.

It will be seen that when the wall shelter units are so connected to the roof unit, a peripheral portion 42 of each wall shelter unit 37 is at the side thereof opposite its vertex or corner 38. In that position, a vertex or corner 43 intermediate the vertex or corner 38 and the opposite peripheral portion 42 of each wall shelter unit is opposed to a vertex or corner 44 intermediate the vertex or corner 38 and the opposite peripheral portion 42 of the next adjacent wall shelter unit, the intermediate vertices or corners 43 and 44 of each wall shelter unit being at opposite sides thereof and those intermediate vertices or corners 43 and 44 of all of the wall shelter units being substantially the same radial distance from the center of the roof shelter unit 36.

As shown in Fig. 5, adjacent wall shelter units 37 are preferably connected together in pairs or groups while they are flat on the ground. Where that optional step is employed, the individual wall shelter units 37′ of each group of two adjacent wall units are swung horizontally about the respective vertical axes of their joint means 41 toward each other until their opposed vertices or corners 43 and 44 are juxtaposed, and thereafter connected together by joint means designated 45 in Fig. 5. Where, as shown in Fig. 5, the roof shelter unit 36 is a regular pentagon, this optional step results in two groups of adjacent, connected wall shelter units 37′ and a single wall shelter unit 37.

Whether or not such grouping or pairing of the wall shelter units is employed, the peripheral portions 42 of the wall shelter units are moved substantially horizontally toward and below the center of the roof shelter unit 36 while the vertices or corners 38 connected to the corners of the roof unit are gradually elevated to elevate the roof shelter unit 36, the horizontal axes of the joint means 41 permitting the relative pivotal movement of the roof and wall shelter units during such movement of the wall shelter units. That movement of the wall shelter units is continued until all of the opposed intermediate vertices or corners 43 and 44 which have not previously been connected together as above described, are brought into juxtaposed relationship and connected together by joint means 46.

Fig. 6 shows the arrangement of the discrete roof and wall shelter units after the roof unit has been so elevated and after all of the juxtaposed vertices or corners 43 and 44 have been secured together. It will be appreciated that with the above disclosed light-weight construction of the roof and wall shelter units 36 and 37, the movement of the wall shelter units to elevate the roof shelter unit as just described may be readily effected manually. Where those shelter units are of the dimensions disclosed above, the juxtaposed vertices or corners 43 and 44 are well within the reach of a workman standing on the ground or supporting surface on which the peripheral portions 42 rest, and, when those vertices are connected together, as just described, the roof and wall units are rigidified into a generally dome-shaped or semi-spherical structure wherein, on the one hand, the apex portions or hub members 23 and on the other hand, all of the vertex or base corner portions including those shown at 38, 39, 43, and 44 are positioned in common substantially spherical surfaces S and S′, respectively, which are concentric to each other as shown in Fig. 16.

Where further rigidity is desired, peripherally succeeding peripheral portions 42 at the base of that structure may be connected together by metal cables or other suitable means 47 which, as shown in Figs. 7 and 8, are connected at their opposite ends to the radial struts 22 adjacent the respective ends of the portions 42. Where the shelter is for temporary use, anchoring cables 48 are, as shown in Fig. 16, secured at their opposite ends to eyebolts 49, one of which is anchored in the hub or apex member 23 of each wall shelter unit, and anchor stakes 51 driven in the ground outwardly of and about the periphery of the shelter. In lieu of or in addition to the anchoring cables and stakes 48 and 51, U-shaped stakes 52 are, as shown in Fig. 8, driven into the ground astride the peripheral portions 42 of each wall shelter unit 37 for releasably anchoring the shelter to the ground.

Figure 9:
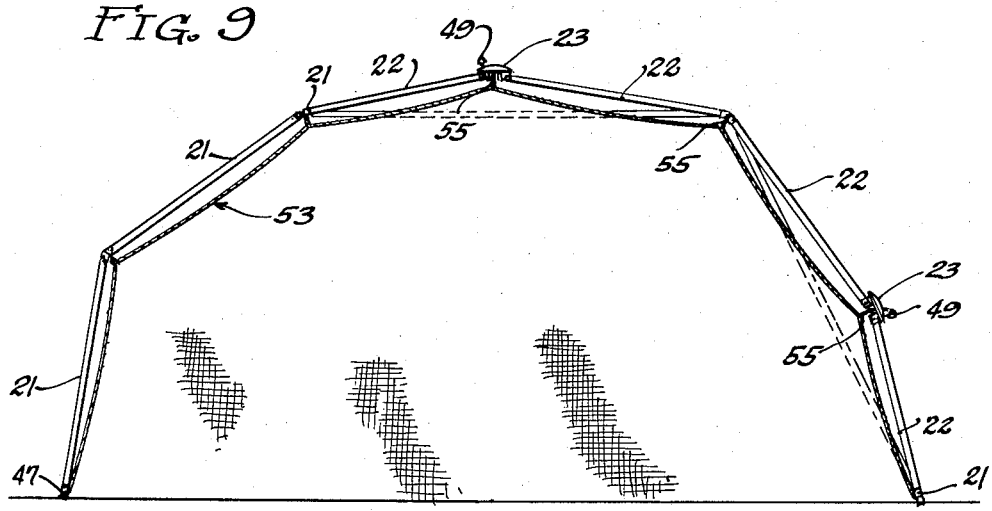
Fig. 9 is a cross-sectional view taken substantially along the lines 9—9 of Fig. 8.

As in the above-identified Fuller patent, where an open framework construction is employed, it may be covered, lined, or covered and lined with skins of plastic or other suitable material, and openings for access, light, and air are provided as desired. In the illustrated embodiment of the invention as shown in Figs. 8 and 9, the framework is lined with a plastic tent 53. Such a tent lining is secured in any suitable manner to the framework. For example, each apex member 23 is provided with a central aperture 54 and the tent 53 is provided with cables or draw strings 55 fixed at their inner ends to the tent at positions on its surface respectively corresponding to the positions of the apex members 23 in the framework whereby to facilitate securing the tent thereto. Each drawstring 55 is drawn outwardly from the tent through the aperture 54 of the corresponding apex member 23 to conform the configuration of the tent substantially to the interior of the framework and is secured at the outer end to, for example, the eye bolt 49 of that apex member 23. Where desired, suitable additional fastening means, not shown, may be employed to supplement the drawstrings 55 for fastening the base margin and other portions of the tent of the framework.

To facilitate and expedite making the improved shelter, a novel and improved connecting device is preferably employed as the joint means hereinbefore designated by the reference characters 41, 45, and 46 for interconnecting the prefabricated, discrete shelter units 36 and 37. Such a connecting device is illustrated in Figs. 12, 13, and 15. As therein shown, it comprises complementary coupling members or connectors 56 and 57. Each of those members is pivotally connectible at one end to an end portion 58 of a radial strut 22 of different shelter units radially outwardly beyond the plates 28 and 29 secured thereto and at the other end is releasably connectible to the other of those coupling members.

The illustrated coupling member 56 is forged or otherwise suitably formed to provide a pair of parallel arms or flanges 59 extending in one direction from opposite sides of an intermediate portion 61. Those flanges 59 are spaced apart sufficiently to receive therebetween one of the end portions 58 of a radial strut 22. Extending in the opposite direction from the intermediate portion 61 is another pair of parallel arms or flanges 62 having parallel surfaces in planes substantially normal to the planes of the parallel surfaces of the arms 59. The parallel flanges 62 are spaced apart sufficiently to receive therebetween a grooved coupling portion 63 of the coupling member 57.

In the illustrated embodiment of the invention, the coupling member 57 comprises a substantially U-shaped member which is forged or otherwise suitably formed to provide a pair of parallel arms or flanges 64 extending in one direction from opposite sides of an intermediate portion 65. They are spaced apart sufficiently to receive therebetween one of the end portions 58 of a radial strut 22. Extending in the opposite direction from the intermediate portion 65, the grooved coupling portion 63 in its illustrated construction comprises a pair of cylindrical members 66 axially spaced apart by a spacer member 67 on the shank of a bolt-and-nut or other suitable pin means 68 anchored at one end in the intermediate portion 65 to provide an annular groove 69 about the spacer member 67 and between the spaced cylindrical members 66.

At one side and intermediate the ends of the arms 62, bolt-and-nut or other suitable pin means 71 is anchored at its opposite ends in those arms and extends therebetween. The shank of that pin means 71 between the arms 62 is receivable in the groove 69 of the coupling member 57. Spaced transversely of the arms 62 from the pin means 71 a distance greater than the diameter or the spacer member 67 and less than the diameter of the cylindrical members 66 is a pair of axially aligned apertures 72 in the arms 62. Those apertures are adapted removably to receive a coupling pin 73 in parallel relationship to the pin means 71 and of such diameter as to be receivable in the groove 69 at the side of the spacer member 67 opposite the pin means 71. That coupling pin 73 has at one end a ring or other suitable handle member 74 for limiting axial movement of the coupling pin in one direction and for facilitating its insertion through and withdrawal from the apertures 72.

Spaced along the coupling pin from the handle member 74 a distance greater than that between the outer surfaces of the arms 62, there is mounted a ball or other detent member 75, a portion of which extends radially outwardly through a recess in a side of the coupling pin 73 and is yieldably held in that position by a coil spring 76 embedded in the coupling pin. The construction is such that with the grooved coupling portion 63 of the coupling member 57 between the arms 62 of the coupling member 56 and the pin means 71 in the groove 69 at one side of the spacer member 67, the coupling pin 73 is insertable through the spaced apertures 72 and the groove 69 at the other side of the spacer member 67, the detent member 75 yielding inwardly of the coupling pin to permit its passage through the apertures, for releasably connecting the coupling members 56 and 57 together. The detent member 75, likewise, yields inwardly during withdrawal of the coupling pin 73 to permit disconnecting the coupling members 56 and 57. It will thus be seen that the coupling members 56 and 57 of the joint means 41, 45, and 46 are manually connectible together and disconnectible and while connected are relatively rotatable about the axis of the pin means 68.

A coupling member 56 is removably pivotally attached to the end portion 58 of each radial strut 22 in the roof shelter unit or truss 36 by bolt-and-nut or other suitable pin means 77 extending horizontally as viewed in Fig. 12 through the arms 59 and the end portion 58 therebetween. A coupling member 57 is removably pivotally attached to the end portion 58 of the radial strut 22 in each wall shelter unit or truss 37 at the base vertex or corner 38 thereof by bolt-and-nut or other suitable pin means 78 extending vertically as viewed in Fig. 12 through the arms 64 and the end portion 58 therebetween. Thus a corner of each wall shelter unit or truss 37 is releasably connectible to each corner of the roof shelter unit or truss 36 by releasably securing together the coupling members 56 and 57 as previously described for swinging movements about the pin means 77 and 78 in directions substantially normal to each other. In a similar manner coupling members 56 and 57 are removably attached to the intermediate vertices or corners 43 and 44, respectively, of adjacent wall shelter units or trusses 37 to facilitate releasably connecting them together as hereinbefore described. Aligned apertures 79 and 81 are provided, as shown in Fig. 3, through each pair of opposite sides of the end portion 58 of each radial strut to adapt the roof and wall shelter units to be pivotally connected together as described above and to render them interchangeable. Thus each of the discrete shelter units 36 and 37 has at least three base vertex or corner portions in respectively juxtaposed relationship to one base vertex or corner portion of each of three others of those shelter units and the novel connecting devices comprising the coupling members 56 and 57 releasably pivotally connect the juxtaposed vertex or corner portions together to rigidify the units in a shelter framework.

It has been found that a five-man crew employing six (6) of the prefabricated shelter units constructed as described above with struts of the described size and folded into bundles like that shown in Fig. 1 can without any tools and without getting off the ground make a novel shelter framework with a base diameter of about 30 feet and a height at the apex of about 12 feet, as illustrated in Fig. 6, by the above described method in from fifteen to thirty minutes as contrasted with the several hours required for such a crew even with special tools to make such a framework by the hitherto known methods involving connecting together the individual struts one at a time. While those known methods of strut-by-strut building may more nearly result in a true geodesic pattern, the slight theoretical strength advantage of such a pattern over the pattern resulting from the novel method and structure of the present invention is far outweighed by the great saving in time and the facility of making the substantially equally strong shelter herein disclosed.

It will also be seen that in just a few minutes by manually removing the pins 73 at the intermediate vertices 43 and 44 from the framework as shown in Fig. 6, it may be manually returned to the flat position of Fig. 4 whereupon the pins 73 at the vertices or corners of the roof shelter unit are manually removable to disconnect the wall shelter units from the roof shelter unit. The wing-head bolts 35 are thereupon manually loosened and each shelter unit or truss is refoldable into a readily portable bundle like that shown in Fig. 1.

The novel shelter constructed as hereinabove described is therefore admirably suitable for huts, hangers, headquarters units for army or other military encampments, and other temporary shelters.

It is thought that the invention and its attendant advantages will be understood from the foregoing description, and it will be apparent that various changes may be made in the form, construction, and arrangement of the parts without departing from the spirit and scope of the invention or sacrificing all of its material advantages, the form hereinbefore described and illustrated in the drawing being merely a preferred embodiment thereof.

I claim:
1. A method of erecting a dome-like shelter from a single roof structural unit and a plurality of peripheral wall structural units, all of said units having a polygonal periphery with a plurality of corners, which comprises arranging all of the units in a common substantially horizontal plane with the wall units about the periphery of the roof unit so that each peripheral corner of the roof unit is juxtaposed with respect to one corner of each wall unit, articulately interconnecting such juxtaposed corners of the roof and wall units, elevating said roof unit by pivoting said wall units about and moving the same underneath their respective articulate connections with the roof unit and relatively toward one another until they are substantially upright, and thereafter interconnecting juxtaposed corners of adjacent wall units to rigidify the shelter.

2. The method as set forth in claim 1 in which some of the wall units are coupled in pairs by articulately interconnecting juxtaposed corners of adjacent wall units while the latter are in the said horizontal plane and preparatory to their movement to substantially upright positions.

3. A rigid, self-supporting structural unit having a periphery in the form of a substantially regular polygon for use with other like units in forming a dome-like shelter and being foldable into an elongated bundle, said unit comprising a hub member at one end of said bundle and coaxial therewith and with said polygon, a plurality of elongated radial members equi-angularly arranged about said hub member and each pivotally connected at one end thereto for restricted swinging movement between folded positions substantially paralleling the longitudinal axis of said bundle and radiating positions extending radially outwardly from said hub member, a peripheral strut associated with each radial member for interconnecting the outer ends of adjacent radial members when the latter are in their said radiating positions, each said peripheral strut having one end pivotally connected to the outer end of its associated radial member for swinging movement between a folded position of adjacent parallelism therewith and an unfolded position wherein said strut projects from its associated radial member to span between the said radial member and an adjacent radial member when said adjacent radial members are in their radiating positions, and means for detachably interconnecting the adjacent swingable ends of radial members and struts when they are in their respective radiating and unfolded positions thereby to provide a rigid, self-supporting structural unit.

4. A foldable shelter comprising a roof truss unit including a central roof apex member, a substantially horizontally, equilateral polygonal roof base having a plurality of corner portions, and a plurality of connecting elements converging from the roof base to said apex member and holding said base and apex member in parallel, coaxial relationship; a number of similar, wall truss units, each including a central wall apex member, an equilateral polygonal wall base having a plurality of base corners, and connecting elements converging from the corners of said wall base to the wall apex member and holding the same in coaxial, spaced, parallel relationship; said wall units being disposed about the periphery of said roof base with the wall bases thereof substantially normal to and bisected by radial planes passing through the said roof apex and the corner portions of said roof base so that one base corner of each wall base is subjacently juxtaposed to one corner portion of the roof base, each wall unit having a pair of base corners at opposite sides of its base with each corner of said pair being juxtaposed to a said base corner of an adjacent one of said wall units; joint means releasably and pivotally connecting each said corner portion of the roof unit to the subjacent base corner of a wall unit for articulate movement of the latter thereabout and between a first position wherein its said wall base is upright and a second position wherein its said wall base and the base of said roof unit are substantially coplanar; and additional joint means releasably connecting the juxtaposed base corners of adjacent wall units when the latter are in their upright first positions to rigidify the shelter and prevent said wall units from moving to their said second positions.

5. A shelter as set forth in claim 4 wherein said roof unit is a pentahedral-like truss.

6. A shelter as set forth in claim 4 wherein each said wall unit is a pentahedral-like truss.

7. A shelter framework of generally semispherical form constructed of a plurality of discrete truss units, each said unit having a central apex connected to and supported by an equilateral polygonal base formed with a plurality of peripheral base corners, at least three of said base corners of each said unit being respectively juxtaposed to one base corner of each of three others of said units, and connector devices articulately interconnecting said units at the juxtaposed corners of their bases to form a stable framework.

8. A shelter framework constructed in accordance with claim 7, wherein said connector devices pivotally couple each base corner of a central one of said truss units to one base corner of each of the remaining said units, respectively, and in a manner permitting pivotal movement of each of the latter units about at least two transversely related axes.

9. A shelter framework constructed in acordance with claim 8, wherein each of said connector devices comprises complementary connector portions releasably interjoined for relative rotation about a third axis generally transverse to said two axes.

10. A shelter framework as set forth in claim 7, comprising six of said discrete truss units each having an equilateral pentagonal base.

11. A shelter framework as set forth in claim 7 wherein one of said truss units is a discrete polyhedral roof truss having an equilateral polygonal base and the others of said truss units are discrete polyhedral-like wall trusses having equilateral pentagonal bases.

12. A foldable structural unit for a shelter, comprising a central hub member, a plurality of peripheral struts of equal length arranged in end-to-end relationship to define corners of a regular polygon larger than and in coaxial relationship to said hub member, a number of radial members extending between said hub member and the corners of said polygon, each said radial member being pivotally connected at one end to said hub member for limited movement relative thereto and to and from parallel relationship with the common axis of said hub member and said polygon, the end of one of said peripheral struts and the end of the other of said peripheral struts defining each of said corners being pivotally connected and releasably connected, respectively, to the adjacent end of the radial member at said corner, and means for releasing the releasable ends of all of said peripheral struts whereby said peripheral struts are pivotally movable about their respective pivoted ends into substantially parallel relationship with the radial members to which they are respectively connected and movable therewith about the respective pivotal connections of said radial members and said hub member into substantially parallel relationship with said common axis.

13. A foldable structural unit for a shelter as set forth in claim 12 wherein said radial members are of such a length as to position said peripheral struts and said hub member in different parallel planes to form a unitary polyhedral-like truss having said hub member at its apex.

14. A substantially dome-shaped shelter comprising a shell constructed of a plurality of discrete polygonal units, each unit having at least three corner portions, each of which is respectively juxtaposed to one corner portion of each of three others of said units, and rigidifying means articulately interconnecting the juxtaposed corner portions of said units to position and hold them in a common substantially spherical surface with all the sides of said units which form the respective juxtaposed and interconnected corner portions thereof being so constrained as to diverge away from the rigidifying means.

(References on following page)

References Cited in the file of this patent

UNITED STATES PATENTS

| | | |
|---|---|---|
| 459,644 | McCandless | Sept. 15, 1891 |
| 2,543,684 | Blanchard | Feb. 27, 1951 |
| 2,555,220 | Brown | May 29, 1951 |
| 2,682,235 | Fuller | June 29, 1954 |
| 2,711,181 | Woods | June 21, 1955 |

FOREIGN PATENTS

| | | |
|---|---|---|
| 760,960 | Great Britain | Nov. 7, 1956 |

OTHER REFERENCES

Article in "Parade" in the Washington Post and Times Herald, page 19, May 2, 1954.